United States Patent [19]

Rickard

[11] 4,182,359
[45] Jan. 8, 1980

[54] SLIDE GATE DAMPER
[75] Inventor: Earl K. Rickard, East Granby, Conn.
[73] Assignee: Combustion Engineering, Inc., Windsor, Conn.
[21] Appl. No.: 864,416
[22] Filed: Dec. 27, 1977
[51] Int. Cl.² ............................................. F16K 3/316
[52] U.S. Cl. ............................... 137/246.22; 137/594; 241/186.2; 251/212
[58] Field of Search ....................... 251/1 R, 1 A, 212; 137/594, 246.22; 277/126, 127, 129; 126/285 A; 166/84; 241/186.2

[56] References Cited
U.S. PATENT DOCUMENTS

| | | | |
|---|---|---|---|
| 778,591 | 12/1904 | Layne | 251/1 A X |
| 860,287 | 7/1907 | Flewwelling | 251/1 A X |
| 1,692,302 | 11/1928 | Hessemer | 251/1 A |
| 3,547,140 | 12/1970 | Hastings et al. | 137/240 |
| 4,044,988 | 8/1977 | Arzumanov et al. | 251/1 A |
| 4,090,534 | 5/1978 | Martin et al. | 251/212 X |

Primary Examiner—Martin P. Schwadron
Assistant Examiner—Richard Gerard
Attorney, Agent, or Firm—Robert L. Olson

[57] ABSTRACT

A slide gate damper arrangement which works well in large ducts, which are conveying hot, dust laden gases, and which duct has an obstruction extending down through the middle of it, such as a concentric pipe. The slide gate arrangement comprises a pair of gates which traverse the large duct from opposite sides thereof, seating in the middle of the duct. The leading edges of the two gates have a configuration such that they match and seal around the inner pipe.

7 Claims, 3 Drawing Figures

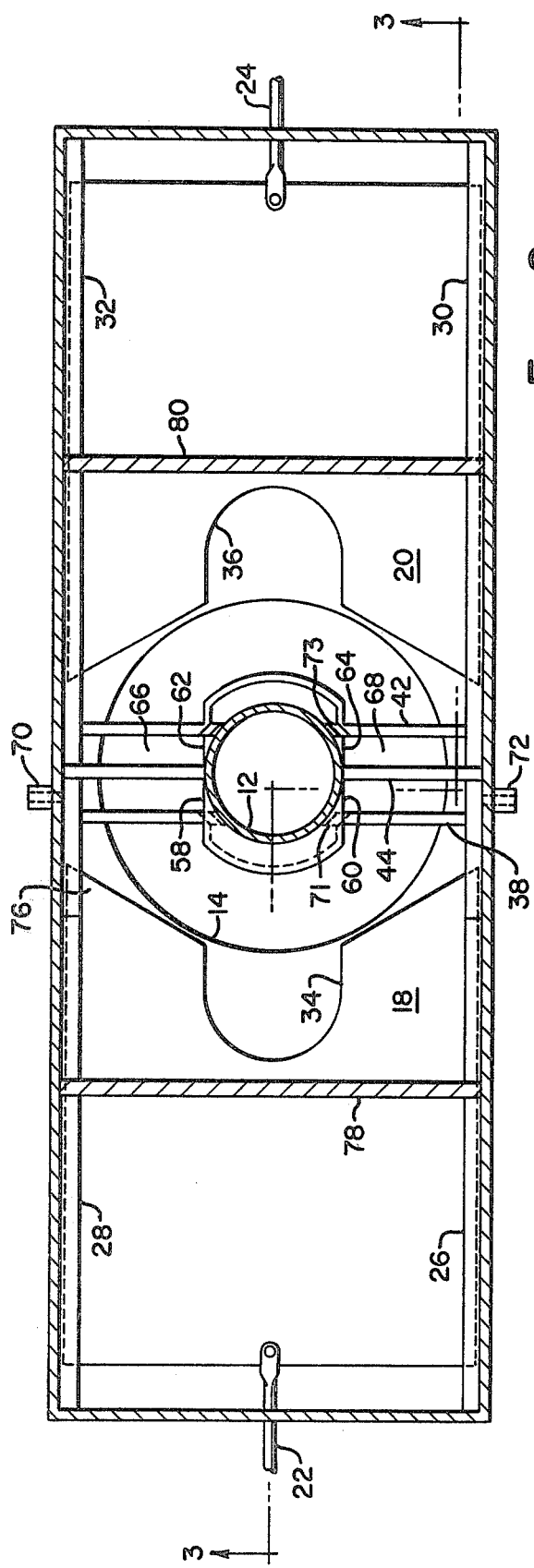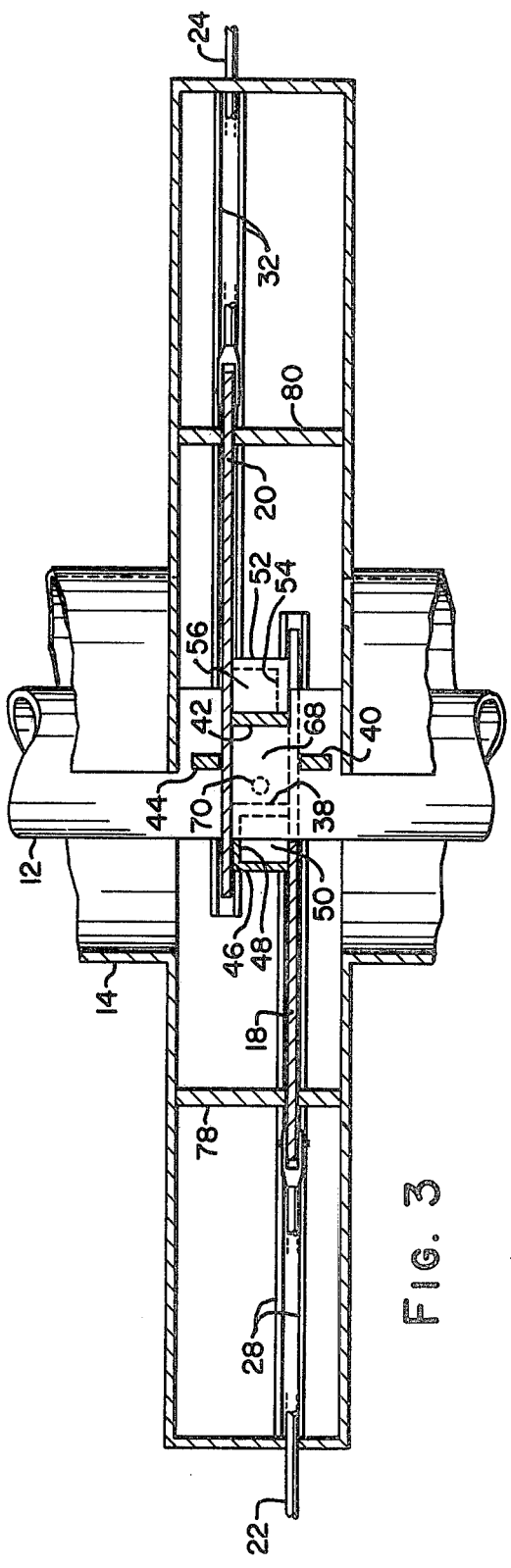

SLIDE GATE DAMPER

BACKGROUND OF THE INVENTION

In large ducts, gate valves are often used for closing the ducts from flow therethrough. Present day gate valves are positioned on one side of the duct, and are moved transversely so they extend entirely across the span of the duct when in a closed position, with the leading edge seating in an end frame. When the duct is conveying hot gases, the large span of the gate can warp, causing proper seating problems in the end frame. Also, when the gases are dust laden, the dust can become trapped in the end frame, preventing proper seating of the gate valve. Further, if there is a need for a concentric pipe, or other central obstruction in the large duct, it is presently impossible to position a gate valve at this location.

SUMMARY OF THE INVENTION

In accordance with the invention a double gate valve arrangement is provided with the gates being positioned diametrically opposite each other, so they close and seat in the middle of the duct. The leading edge of each gate is tapered back from the side edges, so that they will properly seat even if they are slightly warped from the heat. An air seal is provided to prevent any leakage through the gate.

BRIEF DESCRIPTION OF THE DRAWINGS

FIG. 2 is a view of the double gate valve taken on line 2—2 of FIG. 1 with the gates shown in the open position; and FIG. 3 is a view taken on line 3—3 of FIG. 2, with the gates shown in the closed position.

DESCRIPTION OF THE PREFERRED EMBODIMENT

Figure 1:
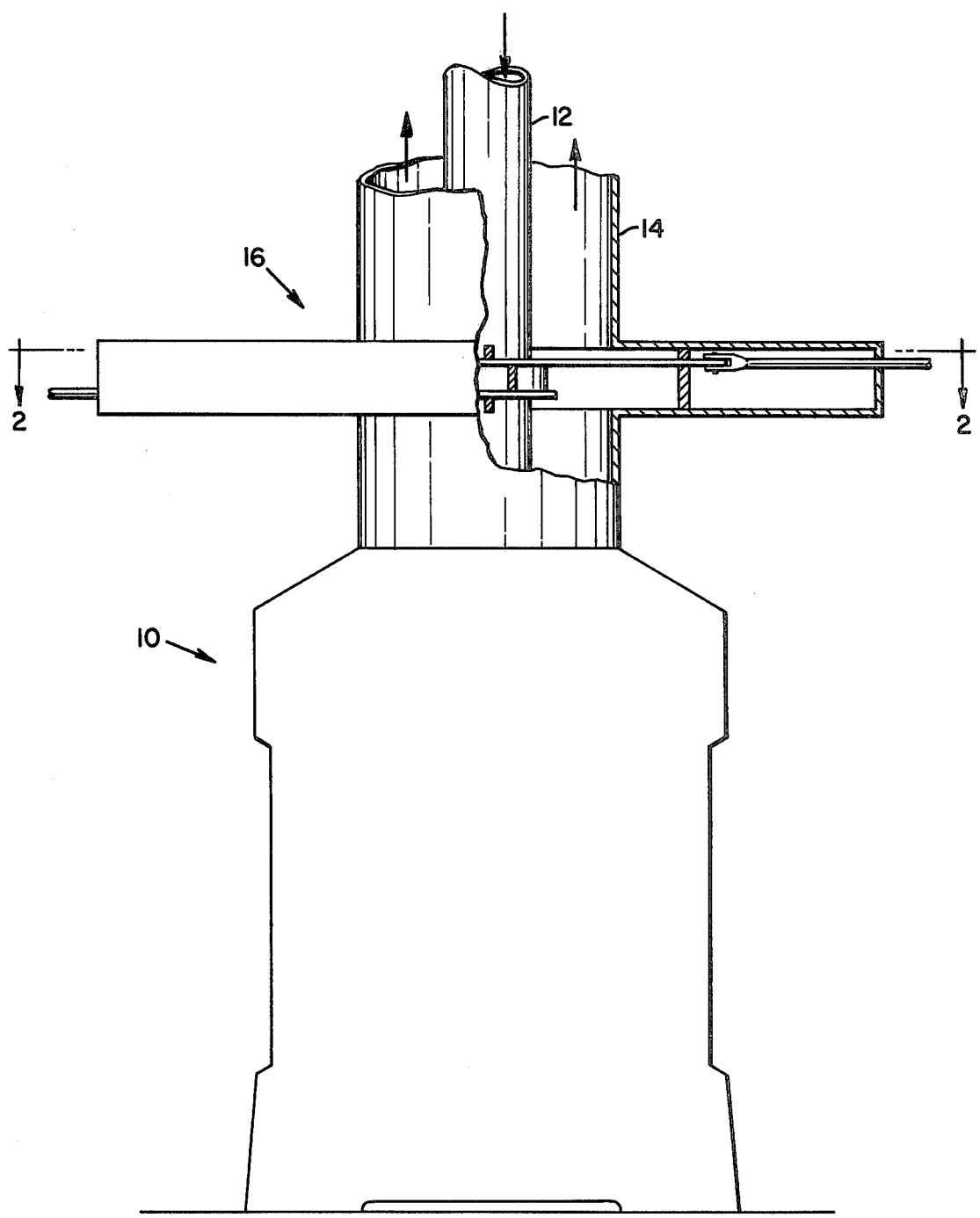
FIG. 1 is an elevational view, partially in section, of the double gate valve of the invention.

Looking now to FIG. 1, numeral 10 shows a pulverizing mill, for example for grinding coal to a flour-like fineness. The raw crushed coal to be pulverized is introduced to the mill through central pipe 12. The pulverized coal is carried out of the mill 10 in a hot air stream in outer duct 14. Safety code regulations require that a closing means be provided, which can shut off the flow in duct 14. Thus, the double gate valve arrangement 16 is provided. This double gate valve allows duct 14 to be closed off, by having the two gates close and seat in the central part of the duct, around the central pipe 12, as explained in more detail below.

Looking now to FIGS. 2 and 3, the details of the double gate valves are shown. A pair of gates 18 and 20 are located diametrically opposite each other, and can be actuated by any suitable means, rods 22 and 24, respectively, being shown. The gate 18 is guided along its side edges in tracks 26 and 28. Likewise, gate 20 is guided in tracks 30 and 32. The leading edge of gate 18 contains a configuration including cutout portion 34, so that in the closed position, it matches and closes around the central pipe 12. Gate 20 contains a similar cutout portion 36. The gate 18 in the closed position seals or seats along its upper surface with sealing plate 38, and along its lower surface with sealing plate 40. Gate 20 cooperates with sealing plates 42 and 44.

An angled plate 46 having an upper shelf portion 48 cooperates with sealing plate 38 to form an enclosed area or chamber 50 when gate 18 is in its closed position. Likewise, an angled plate 52 having a lower portion or shelf 54 cooperates with sealing plate 42 and gate 20 to form an enclosed chamber 56. Ears or tabs 58 and 60 complete closure for the chamber 50, and ears 62 and 64 complete the enclosure for chamber 56. When the gates are closed, pressurized or sealing air is admitted to the chambers 66 and 68 through ports 70 and 72. This air reaches chambers 50 and 56 through passages 71 and 73 cut in plates 38 and 42, respectively. The shelves 48 and 54, in addition to forming one wall of the air chamber 50 and 56, also allow for a better seating of the slide gates, than would be possible if they merely seated up against the wall of inner pipe 12. The sealing plates 78 and 80 provide the function of keeping the dust laden air from escaping to the atmosphere when the gates are in their open position.

As can be seen in FIG. 2, the leading edge of gate 20 is angled back from its side edges 74 and 76. This is for the purpose of allowing proper closure of the gate, even if it has warped some because of the hot air. The leading edges which are held in their proper planes by the tracks 26, 28 will clear the plate 38. Thereafter, the middle of the gate will be cammed into place as the gate is moved further past the gate 38, even if the gate is somewhat warped. This can be a real problem on present day gates that are many feet wide and long, which are exposed to hot gases.

From the above, it can be seen that a gate has been provided that will properly seat, even in dust laden, or hot atmospheres. Also, the double gate valve arrangement can seat around an obstruction, such as a central pipe. Obviously, any of the above features can be used singularly; for example, the double gate valve arrangement has use in ducts that do not have a central obstruction.

What is claimed is:

1. In combination, a duct, an obstruction within the duct, a pair of diametrically opposed, axially spaced gate valves each having a pair of face surfaces, which gate valves in an open position are located on opposite sides of the duct, the leading edge of each gate valve having a configuration that matches the obstruction, stationary sealing plate means extending across the interior of the duct, each gate valve in its closed position having one of its face surfaces closely matched and seated on the sealing plate means, the sealing plate means completely closing the axial space between the gate valves, so that the duct is closed off completely when both gate valves are in their closed position.

2. The combination set forth in claim 1, wherein the obstruction is a pipe whose longitudinal axis extends in the same direction as the longitudinal axis of the duct.

3. The combination set forth in claim 2, including tracks secured to the duct walls within which the gate valves move.

4. The combination set forth in claim 3, including wall means which together with the sealing plate means and the gate valves when in their closed positions, forms a chamber means, and means for introducing pressurized sealing air into the chamber means.

5. The combination set forth in claim 3, wherein the leading edge of each gate valve is cut back in a tapered manner from each side edge, so that the side edges of each gate valve are the first portions to engage the sealing plate means when the gate valves are moved in a closing direction.

6. In combination, a duct, a pair of diametrically opposed, axially spaced gate valves each having a pair of face surfaces, which gate valves in an open position are located on opposite sides of the duct, stationary sealing plate means extending across the interior of the duct, each gate valve in its closed position having one of its face surfaces closely matched and seated on the sealing plate means, the sealing plate means completely closing the axial space between the gate valves, so that the duct is closed off completely when both gate valves are in their closed position.

7. The combination set forth in claim 6, including tracks secured to the duct walls within which the gate valves move, the leading edge of each gate valve being cut back in a tapered manner from each side edge, so that the side edges of each gate valve are the first portions to engage the sealing plate means when the gate valves are moved in a closing direction.

* * * * *